United States Patent [19]
Perry

[11] Patent Number: 4,796,290
[45] Date of Patent: Jan. 3, 1989

[54] GROUND START CIRCUIT

[75] Inventor: Steven B. Perry, Perrineville, N.J.

[73] Assignee: Keptel, Inc., Tinton Falls, N.J.

[21] Appl. No.: 159,720

[22] Filed: Feb. 24, 1988

[51] Int. Cl.$^4$ .............................................. H04M 1/24
[52] U.S. Cl. .......................................... 379/27; 379/1; 379/234
[58] Field of Search ........................ 379/22, 27, 29, 26, 379/231, 234, 350, 352

[56] References Cited

U.S. PATENT DOCUMENTS 3,927,272 12/1975 Bloxham et al. ..................... 379/234

*Primary Examiner*—Stafford D. Schreyer
*Attorney, Agent, or Firm*—Peter L. Michaelson

[57] ABSTRACT

Various embodiments of a ground start circuit suited for use in telecommunication applications, illustratively in conjunction with a ground start line, and a method for use in the circuit for invoking ground start operation on such a line are described. In essence, as soon as a telephone line is connected across the inventive ground start circuit, a potential difference that appears between a ring side of a two-wire telephone line and earth ground causes a control voltage internal to the circuit to increase in magnitude. Once this control voltage reaches a threshold value, then the circuit establishes a low impedance path between the ring side of the line and earth ground in order to place the line in an unbalanced condition. This low impedance path is maintained until a central office connected to the line at a remote end thereof senses the unbalanced condition and, in response, applies battery voltage to the line to cause loop current to flow therethrough, i.e. through a loop formed of tip and ring wires that form the line. As soon as the inventive circuit detects the presence of loop current through, for example, a resistive loop current detector, the circuit eliminates the low impedance path thereby returning the telephone line to a balanced condition. At this point, the inventive circuit becomes substantially electrically transparent to normal functioning of the line. The central office then applies dial tone to the line in order to allow a caller to initiate an outgoing call.

20 Claims, 3 Drawing Sheets

GROUND START CIRCUIT

BACKGROUND OF THE INVENTION

1. Field of the Invention

The invention relates to apparatus for a ground start circuit suited for use in telecommunication applications, illustratively in conjunction with a ground start line, and a method for use in the circuit for invoking ground start operation on such a line.

2. Description of the Prior Art

Telephone lines designed for use as business lines, such as for example those connected to private branch exchanges (PBXs) or private automatic branch exchanges (PABXs) (hereinafter collectively referred to as PBXs), frequently utilize a ground start protocol to obtain dial tone from a central office. Use of such a protocol advantageously prevents "head-on" or glare from occurring, i.e. when an exchange connects a caller to a telephone line that is already in use by another party and thereby, due to the shared status of the line, superimposes one call over another.

In essence, a telephone line consists of a balanced pair of wires, commonly referred to as tip and ring wires (or leads), that form a loop with a central office at one end and, in this case, a subscriber's PBX at the other. Whenever a telephone line that employs a ground start protocol (hereinafter referred to as a ground start line) is in an idle state and hence not carrying an active call, then the central office will not apply any voltage between the tip and ring wires that form this line. In essence, the central office will permit the potential of the tip lead to float with respect to earth ground. Now, in order to obtain dial tone on the ground start line, such as for example to place an outgoing call, the PBX must first detect that no loop current is flowing in the line (i.e. that the line is idle) and, if so, then momentarily unbalance the loop by applying an earth ground potential to the ring wire. This, in turn, causes a direct current (DC) to flow between the ring side of the loop and earth ground. Once equipment located at the central office and connected to a far end of this line senses the unbalanced condition, then this equipment applies battery voltage, typically 48 volts DC, between the tip and ring wires of this line. At essentially the same time or even somewhat before, the PBX connects a load between the tip and ring wires to load the line. After the ring wire has been grounded for a period of time, the ring ground is removed to eliminate the unbalance in the line. At this point, the central office applies dial tone across the line. The subscriber who is connected through the PBX to this line can now initiate an outgoing call.

Various PBXs that are currently on the market utilize "timed" ground start circuits that disadvantageously maintain an unbalanced condition throughout a timed interval. Specifically, these timed ground start circuits first establish a connection between earth ground and the ring side of the line (i.e. a "ground mark") and then, by relying on an internal timer, maintain the ground mark throughout a pre-determined interval of time with the expectation that equipment at a central office connected to that line will detect and respond to the timed ground mark. Unfortunately, if the pre-determined time interval is too short, as it frequently is, then equipment at the central office may not detect the timed ground mark and hence not provide loop current and dial tone to the line. As such, any such PBX that utilizes a timed ground start circuit which employs a short interval timed ground mark may provide unreliable operation with certain central offices. Now, if such PBXs were to be universal compatible, i.e. operate reliably with equipment that exists at substantially any central office, then the timed ground start circuit should maintain the timed ground mark for at least three seconds, which is the maximum interval defined by telephone company specifications. Unfortunately, use of such a long interval may disadvantageously impede the response of certain central offices thereby limiting the amount of traffic which that central office can simultaneously switch. Moreover, such a timed ground start circuit requires additional support circuitry to appropriately set and reset the timer. This additional circuitry disadvantageously increases the size, cost and complexity of the ground start circuit while simultaneously decreasing its reliability.

Furthermore, not only do PBXs need to contain circuitry that momentarily unbalances a ground start line but also test equipment that is situated anywhere on a ground start line or at a subscriber's location at an end of the line must also contain ground start circuitry.

Specifically, in the current deregulated telephone environment, the local telephone company provides a telephone line, local telephone service and access through its switching facilities to long distance vendors, but is generally not responsible for the wiring ("inside wiring") and telephone equipment existing inside a subscriber's premise. Therefore, it has become quite advantageous to connect test equipment to the telephone line at a known point of demarcation, typically a wiring block located on the outside of a subscriber's building, where the local telephone company's wiring terminates and hence its responsibility ends. Doing so allows the subscriber, interconnect company or local telephone company to test the line and thereby determine not only whether a fault exists in the line but also importantly whether that fault lies within the local telephone company portion of the line or within the subscriber's portion, i.e. inside wiring and customer premise equipment, such as a PBX, connected thereto. This test equipment may illustratively contain circuitry that tests the amplitude and frequency of dial tone provided by the central office and appearing on the line. An example of such remotely mounted test equipment but designed for use with loop start lines is described in our U.S. Pat. No. 4,679,224 (issued July 7, 1987 to D. Lynch et al). Now, in order for this test equipment to properly function in conjunction with a ground start line, the test equipment must contain a ground start circuit that provides a momentary current path from the ring side of a subscriber loop to earth ground in order to obtain dial tone.

Test equipment designed for mounting at a subscriber's location must be highly reliable. Telephone lines, once installed, frequently remain in place and in service for several years if not longer. A fault, which requires that the line be tested, can occur anytime during this period of time. Consequently, any test equipment designed to remain connected to a telephone line at a subscriber location must be able to accurately operate upon demand anytime over a period of time spanning at least several years. Since, business subscribers frequently have a large number of separate lines entering a business location, the test equipment should also consume as little space as possible.

Unfortunately, ground start circuits known in the art frequently utilize a large number of components typically including large valued capacitors and relays. As such, these circuits have tended to be quite complex, expensive and bulky. Because of the large component count and mechanical contacts used in the relays, these prior art circuits also have limited reliability. As such, the prior art ground start circuits, particularly those using relays, have been found to be generally unsuitable for use in those applications, particularly but not exclusively occurring in remotely mounted telephone line test equipment, where small space, low cost and high reliability are needed.

Thus, a need exists in the art for a ground start circuit that is universally compatible with equipment at substantially any central office and does not rely on use of a timed ground mark. Moreover, such a ground start circuit should be simple, solid state (i.e. uses no relays), relatively inexpensive and formed of a relatively small number of components. In addition, such a ground start circuit should also consume a small amount of space and exhibit a very high degree of reliability.

SUMMARY OF THE INVENTION

Accordingly, an object of the present invention is to provide a ground start circuit is universally compatible with equipment at substantially any central office.

Another object is to provide such a circuit that does not rely on use of a timed ground mark.

Another object is to provide such a circuit that is simple and rather inexpensive.

Another object is to provide such a circuit that utilizes a relatively small number of components.

Another object is to provide such a circuit that occupies a rather small amount of space.

Lastly, an additional object is to provide such a circuit that is solid state and exhibits a very high degree of reliability.

These and other objects are accomplished in accordance with the teachings of the present invention by the inventive ground start circuit which contains: means, connected between an earth ground connection and a first terminal that is to be connected to one side (such as the ring side or wire) of a two-wire telephone line and operative in response to a potential difference appearing thereacross, for providing a control signal that changes in value; means, connected between the first terminal and the earth ground connection and responsive to the control signal, for establishing a low impedance path between the first terminal and the earth ground connection whenever the control signal reaches a threshold value whereby the telephone line is placed in an unbalanced condition; and means, connected to the providing means and responsive to a potential difference subsequently applied across the first terminal and a second terminal that is to be connected to the second side (such as the tip side or wire) of the two-wire telephone line, for decreasing the value of the control signal to a level sufficient for the establishing means to eliminate the low impedance path existing between the first terminal and the earth ground connection, whereby the telephone line is returned to a substantially balanced condition.

In accordance with specific embodiments of the present inventive ground start circuit, the circuit contains a capacitor connected in series with a resistor that are together placed between the ring wire (or lead) of a two-wire telephone line and an earth ground connection. One end of the capacitor is connected to the ring wire; while the other end of the capacitor is connected to one end of the resistor. The other end of the resistor is connected to the earth ground connection. As soon as a switch is depressed to connect the two-wire telephone line across the inventive ground start circuit, a positive potential difference exists between earth ground and the ring wire. This causes the capacitor to charge through the resistor. The increasing voltage (i.e. a "control voltage") appearing at a junction point between the capacitor and resistor is applied to a gate of a voltage controlled device, such as a field effect transistor (FET), also contained within the inventive ground start circuit. As soon as the voltage appearing across the capacitor increases to a pre-defined threshold value, the FET will then turn on. The source of the FET is connected to the ring wire. The drain of the FET is connected through a low value resistor to earth ground. Consequently, when the FET turns on, a low impedance path (ground mark) is established between the ring wire and earth ground which causes an appreciable amount of current to flow from earth ground into the ring wire, thereby unbalancing the telephone line. The inventive ground start circuit also contains a loop current detector. This detector takes the form of a resistive load placed either across (as in the first embodiment of the inventive circuit) or in series with (as in the second embodiment of the inventive circuit) the line to provide a voltage whenever loop current is supplied by a central office and flowing through both sides (tip and ring) of the telephone line. The voltage provided by the loop current detector is applied through an appropriate resistor to provide sufficient base current to a transistor that when energized provides a low impedance discharge path for charge stored on the capacitor. This transistor functions as a current switch. Hence, once the line becomes unbalanced, a central office remotely connected to the far end of the line will shortly thereafter apply battery voltage to the line so as to cause loop current to flow therein. The presence of loop current causes a voltage to be generated by the loop current detector which, in turn, energizes the current switch to discharge the capacitor. This, in turn, causes the control voltage appearing across the capacitor to decrease to substantially zero thereby turning off the FET and eliminating the low impedance path that occurred between the ring wire of the telephone line and earth ground. As soon as this occurs, the telephone line returns to a balanced condition. As long as the telephone line remains active from this point on, the inventive ground start circuit advantageously remains essentially electrically transparent to normal functioning of the line.

Thus, the inventive ground start circuit maintains the ground mark as long as the central office requires it and then responds essentially immediately to remove the ground mark from the telephone line as soon as loop current is provided by the central office. As a result, the inventive ground start circuit becomes compatible with equipment at substantially any central office. Advantageously, the inventive ground start circuit will not impede the response of a central office as is typical of timed ground start circuits known in the art but rather will allow dial tone to be provided as quickly and efficiently as any central office will permit.

BRIEF DESCRIPTION OF THE DRAWING

The teachings of the present invention may be clearly understood by considering the following detailed description in conjunction with the accompanying drawing, in which.

To facilitate understanding, identical reference numerals have been used in the drawing to denote elements that are common to the figures.

DETAILED DESCRIPTION

After reading the following description, those skilled in the art will readily recognize that the inventive ground start circuit can find use in a wide multitude of different telecommunications applications involving customer premise telephone equipment, such as private branch exchanges (PBXs) or private automatic branch exchanges (PABXs) (both of which will hereinafter be referred to as PBXs) and telephone line test equipment. For the sake of brevity, the inventive ground start circuits will be described in the context of a telephone line (subscriber loop) testing system for use in testing an individual ground start line.

Figure 1:
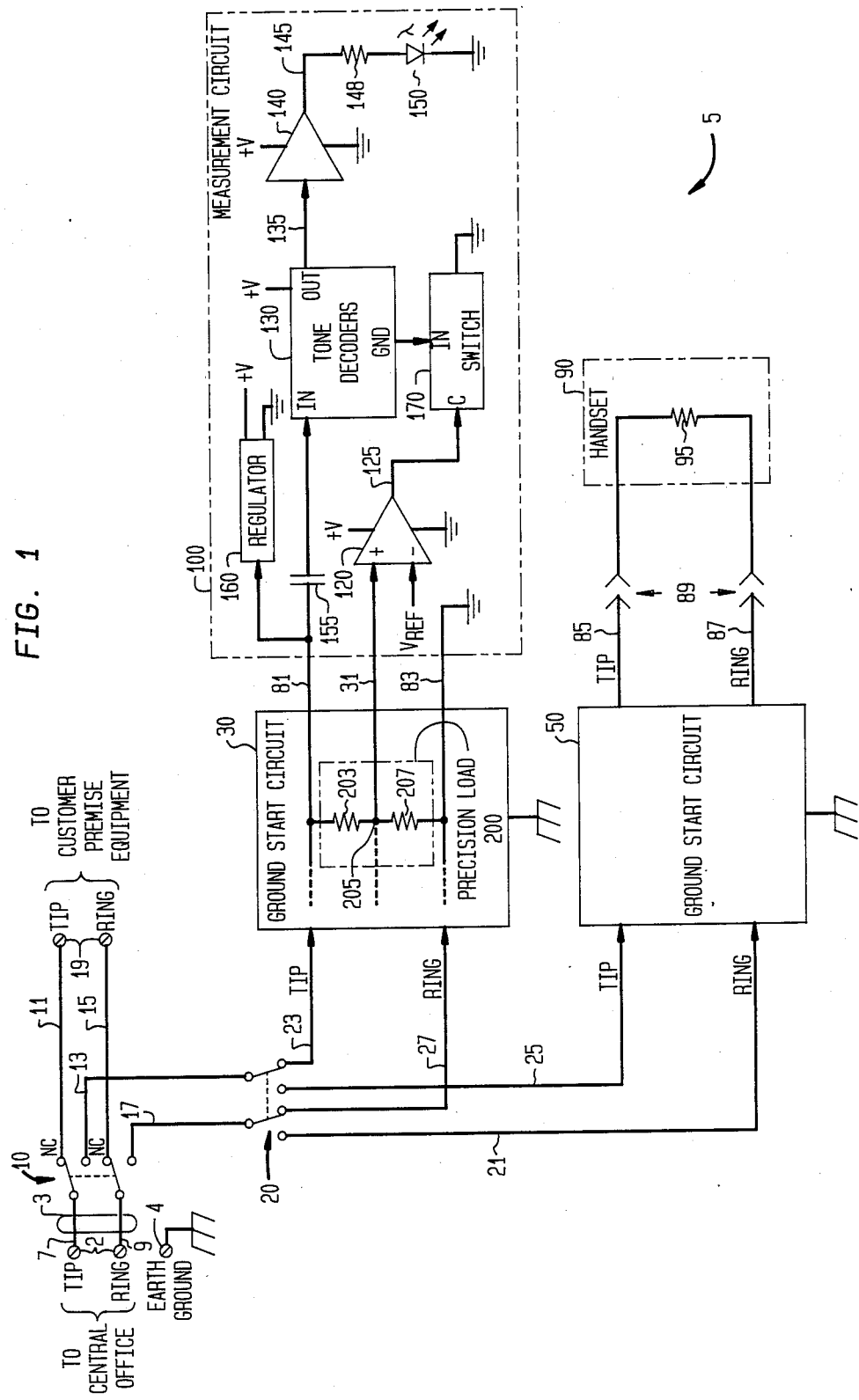
FIG. 1 shows a block diagram of subscriber loop testing system 5 which incorporates two different embodiments of the inventive ground start circuit.

FIG. 1 shows a block diagram of subscriber loop testing system 5 which incorporates two different embodiments of the inventive ground start circuit. As shown, system 5 is connected in series with telephone line 3 typically and preferably at its point of demarcation between a portion (not shown) of the line that is the responsibility of a local telephone company and the remaining portion of the line ("inside wiring" and associated customer premise equipment) that is the ultimate responsibility of a subscriber. Through use of this system, a user (e.g. a subscriber, an interconnect company or a local telephone company) can test the telephone line to determine where a fault exists on the line and, consequently, whether a local telephone company bears the responsibility to repair the fault.

Specifically within test system 5, tip and ring wires (sides or leads) that form telephone line 3 are connected, via terminals 2 and leads 7 and 9, to corresponding armatures of switch 10 which is preferably a momentary pushbutton switch. Terminal 4 is an earth ground connection. In its normally closed (NC) position, both armatures of this switch route signals appearing on the tip and ring sides of line 3 to leads 11 and 15, respectively, which are, in turn, connected, via terminals 19 to tip and ring sides of a telephone line that connects to a subscriber's inside wiring and customer premise equipment, e.g. a PBX. Once test system 5 is connected to telephone line 3 in this manner, it preferably remains so connected as long as that line is available for use by a subscriber (customer).

A user can test telephone line 3 at any time and determine whether a fault exists on either the subscriber or telephone company side of the point of demarcation of the line by merely depressing switch 10. As long as switch 10 is depressed, this switch disconnects the inside wiring and all customer premise equipment connected to this line on the subscriber's side of the point of demarcation from the line and instead connects the local telephone company portion of the line to the remainder of the test system to test the line. These tests preferably involve amplitude measurements of loop current and amplitude and frequency measurements of dial tone, both signals appearing on the line and provided by a central office (not shown) remotely connected thereto at a far end of the line.

In particular, while switch 10 is depressed, the armatures of this switch connect line 3 to leads 13 and 17 which, through switch 20, are both connected to the remainder of the subscriber loop test system. Switch 20, which is typically a slide switch, allows the line being tested to be connected through tip and ring leads 23 and 27, respectively, to ground start circuit 30 and through leads 31, 81 and 83 to measurement circuit 100. Ground start circuit 30, which is described in detail in conjunction with FIG. 2, momentarily unbalances telephone line 3 by establishing a low impedance current path between the ring side (lead 9) of this line and earth ground ("ground mark") to obtain direct current (DC) battery voltage and hence loop current from the central office. In addition, circuit 30 places precision load 200 formed of resistors 203 and 207 across the tip and ring sides of line 3 in order to load the line and thereby continue to obtain DC loop current and shortly thereafter obtain dial tone from the central office. Once this has occurred, ground start circuit 30 removes the ground mark from the line and thereby becomes essentially transparent to telephone line 3. Now, with dial tone present on line 3, measurement circuit 100 is then used to provide a visual indication that the dial tone appearing at the subscriber's location on this line has the proper amplitude level and frequency characteristics and also that adequate loop current is flowing through the line. Circuit 100 principally contains voltage comparator 120, tone decoders 130, driver 140, resistor 148 and light emitting diode 150, capacitor 155, regulator 160 and current switch 170.

In operation, while switch 10 is depressed and once dial tone is applied by the central office to line 3, the voltage appearing on that line (i.e. the battery voltage, typicaly 48 volts DC, modulated by a fairly low level AC dial tone voltage) is applied, through switch 20 and ground start circuit 30, to measurement circuit 100. Within ground start circuit 30, the line voltage is applied across precision load 200 which provides a precise load to check for the presence of adequate loop current and an appropriate AC terminating impedance for the line. To check for adequate loop current, precision load 200 contains resistors 203 and 207 which collectively form a voltage divider to attenuate the voltage produced across the load down to a suitable level. The attenuated load voltage appearing across resistor 207 is applied, via lead 31, to the non-inverting input of comparator 120. A pre-defined threshold voltage, $V_{REF}$, is applied to the inverting input of this comparator. Consequently, as long as the attenuated load voltage is in excess of the threshold voltage—as it normally should be—thereby indicating that the amplitude of the DC loop current is in excess of a pre-defined minimum amount, comparator 120 produces a high level on its output lead 125. This high level is applied to a control (C) input of current switch 170. This switch is typically a current sink formed of a single NPN transistor. Consequently, when the switch operates, i.e. the transistor is switched on, current can flow from the ground (GND) terminal of tone decoders 130 to system ground. As such, once switch 170 begins to sink current, this causes the tone decoders to "power up". Inasmuch as measurement circuit 100 is powered from the line voltage, keeping the tone decoders off until after comparator 120 determines that an adequate amount of loop current is flowing advantageously prevents the tone decoders and LED 150 from loading the line while a loop current measurement is being made. This insures that the loop current measurement will not be corrupted by the relatively large current draw of the tone decoders and LED. Tone decoders 130 generally comprise two separate well-known tone decoders connected in a parallel configuration and set to detect either one of two standard dial tone frequencies, i.e. 350 or 400 Hz. These decoders will produce a high level whenever either of these dial tone frequencies exist on the line with an amplitude equal to or greater than a pre-determined minimum amount. For purposes of simplification, these tone decoders are collectively shown as one block. The AC dial tone voltage is capacitively coupled, via capacitor 155, to a signal input (IN) terminal of tone decoders 130. Consequently, in the event the dial tone is either 350 or 400 Hz and has an appropriate amplitude, then tone decoders 130 produce a high level at an output (OUT) terminal. This level is applied, via lead 135 to an input of driver and latch 140. In response to the high level, driver/latch 140 applies a high output level to lead 145 and latches this level. This level, in turn, provides suitable drive current, determined by resistor 148, to fully illuminate light emitting diode (LED) 150. This LED is suitably chosen to emit green colored light. Such an indication notifies the user that an adequate amount of loop current is being provided by the central office and that the telephone dial tone provided by the central office has the proper amplitude and frequency characteristics. From this indication, the user determines that the telephone line, at least from the central office to the point of demarcation, is functioning properly. Alternatively, if insufficient loop current is flowing in the line, due to for example equipment failure at the central office, then comparator 120 will produce a low level at its output which, when applied to the control input of switch 170, will not cause the tone decoders to "power up." As such, driver 140 will produce a low level which will not energize LED 150. Also, if the AC dial tone is of an improper frequency or has an insufficient amplitude, then tone decoders 130 will produce a low level at its output which will also prevent LED 150 from illuminating. Circuit 100 derives its power from the voltage appearing on line 3. The line voltage is applied to regulator 160 which, in turn, generates an adequate DC voltage level (+V) needed to power circuit 100.

Figure 3:
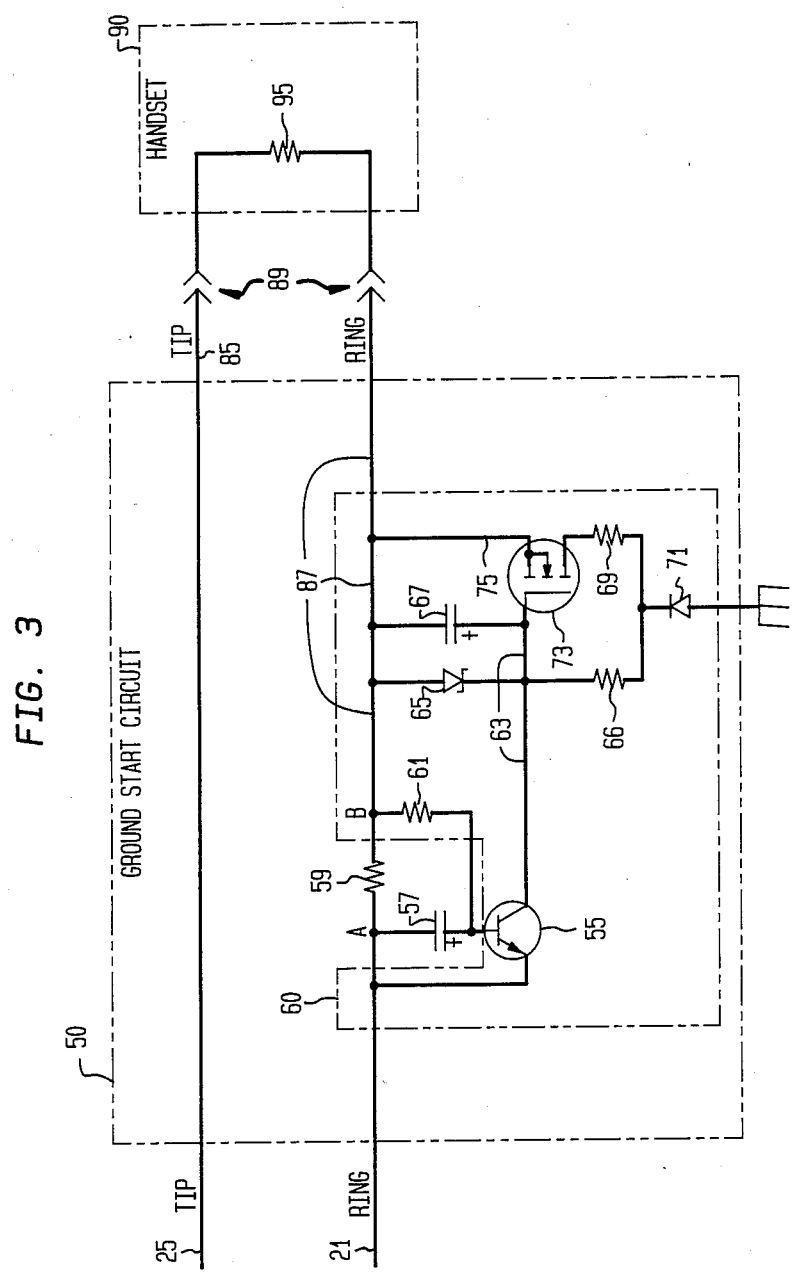
FIG. 3 depicts a schematic diagram of a second embodiment of the inventive ground start circuit, i.e. ground start circuit 50, shown in FIG. 1.

In lieu of utilizing measurement circuit 100 to test telephone line 3, a user can connect external equipment, such as handset 90 (or a telephone) to line 3, via a well-known telephone modular plug (or terminals) 89, in order to monitor the line. In this case, the user would change the position of switch 20 such that its armatures route the signals appearing on leads 13 and 17 to ground start circuit 50, via leads 21 and 25. This ground start circuit, as described in detail below in conjunction with FIG. 3, is similar to ground start circuit 30 except that circuit 50 contains circuitry that enables it to operate with an external load, such as external load 95 contained within handset 90. The tip and ring output of ground start circuit 50 is applied through leads 85 and 87 to appropriate inputs of handset 90.

Figure 2:
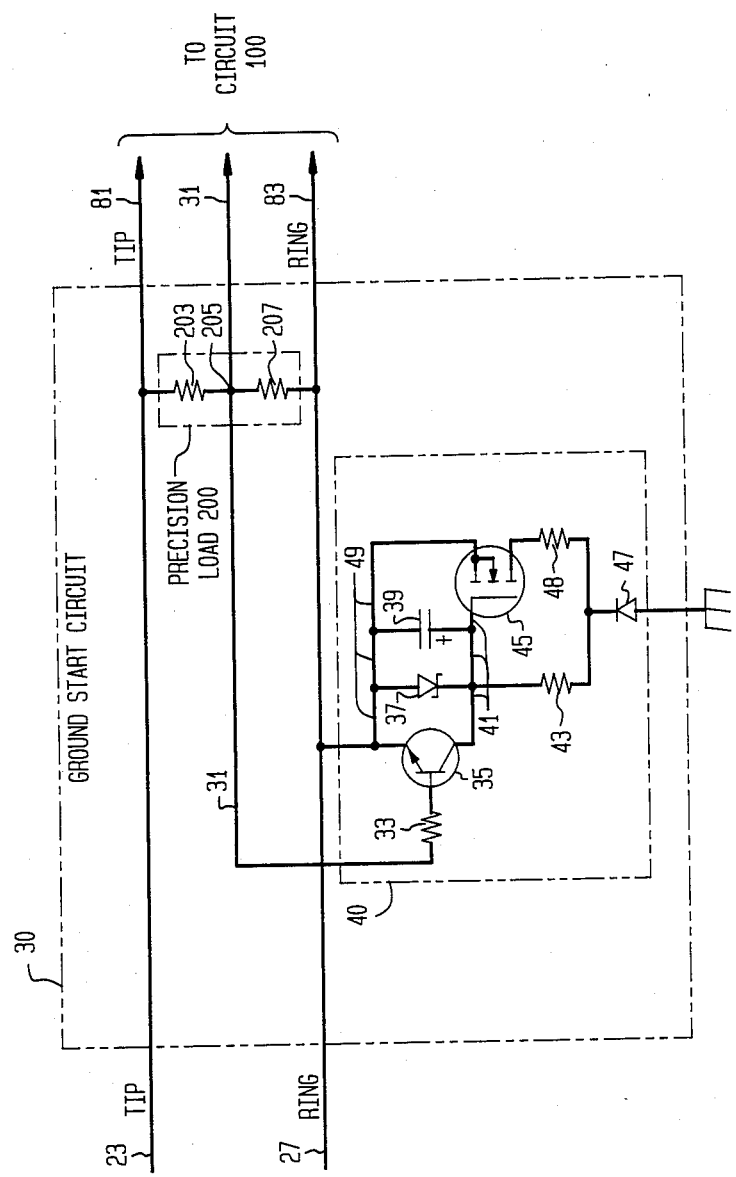
FIG. 2 depicts a schematic diagram of one embodiment of the inventive ground start circuit, i.e. ground start circuit 30, shown in FIG. 1.

FIG. 2 depicts a schematic diagram of a first embodiment of the inventive ground start circuit, i.e. ground start circuit 30, shown in FIG. 1. As shown in FIG. 2, tip and ring leads 23 and 27 run directly through circuit 30 and emerge as leads 81 and 83 for connection to measurement circuit 100 (see FIG. 1). Precision load 200, as discussed above, is connected across tip and ring leads 23 and 27 with the attenuated load voltage appearing at junction 205 being connected, via lead 31, to circuit 100. In addition, as shown in FIG. 2, ground start circuit 30 also contains circuit 40 that momentarily connects ring lead 27 to earth ground thereby momentarily unbalancing telephone line 3 to obtain loop current and dial tone from the central office.

Circuit 40 contains resistors 33, 43 and 48; transistor 35; zener diode 37; capacitor 39; field effect transistor (FET) 45; and diode 47. One side (end) of resistor 33 is connected to junction 205 while the other side is connected to the base of transistor 35. Zener diode 37 and capacitor 39 are both connected, via leads 41 and 49, across the emitter and the collector of transistor 35. This transistor is preferably an NPN bipolar transistor. The emitter of this transistor is connected to ring lead 27. In addition, the collector of transistor 35 is also connected, via lead 41, to the gate of FET 45. The source of this FET is also connected, via lead 49, to the emitter of transistor 35. The collector of transistor 35 is also connected to one end of resistor 43. The drain of FET 45 is connected to one end of resistor 48. Both of the other ends of resistors 43 and 48 are connected to the cathode of diode 47. The anode of this diode is connected to earth ground.

Now, to understand the operation of circuit 40 assume for the moment that switch 20 has been set to connect the telephone line voltage to ground start circuit 30 and that switch 10 (see FIG. 1) has not yet been depressed. At this point, transistor 35 and FET 45 situated within circuit 40 (see FIG. 2) are both off. The circuit remains in this state until switch 10 is depressed. Since telephone line 3 is a ground start line, at the instant switch 10 is depressed, there will be no potential across the tip and ring sides of the line and hence no loop current flowing in the line. At this point, the line is balanced. However, there will be a positive potential measured from earth ground to ring lead 27. By virtue of this potential, capacitor 39 will begin to charge from current flowing from earth ground through diode 47 and resistor 43. Consequently, the voltage appearing across this capacitor (also referred to herein as the "control signal") will increase. Zener diode 37 limits the voltage appearing across the capacitor to a level, typically 14 volts, which is safely below the maximum gate potential of FET 45. This capacitor wil continue to charge until its potential reaches a pre-defined threshold level which is sufficient to turn FET 45 on. Once the FET turns on, a relatively large amount of drain current flows through resistor 48 and FET 45 to the ring side of the line. No current flows in the tip side. As such, at this point line 3 becomes highly unbalanced. The value of resistor 48, typically 330 ohms, is chosen to allow sufficient minimum DC current to flow into the ring side of the telephone line in order to establish an unbalanced condition that is detectable by the central office but not enough current to cause a potential across this resistor which would disadvantageously result in turning FET 45 off.

Whenever a telephone line becomes unbalanced, it can disadvantageously experience power line induction. Specifically, AC power lines generate fairly large AC magnetic fields. In addition, an AC power line is frequently mounted on the same pole as a telephone line. Consequently, the AC magnetic fields generated by such a power line will induce AC currents into an unbalanced telephone line which are, in turn, converted into a metallic signal. These induced signals can be significant. In particular, a longitudinal influence, i.e. a superimposed voltage, of significant potential possibly reaching as much as 100 volts may appear between either the tip or ring sides of the line and earth ground as a result of this AC power induction. Ideally, if the telephone line is balanced, there is no potential difference resulting from the AC power induction and appearing between the tip and ring sides of the telephone line. However, if such an unbalance exists, then as little as approximately 0.5 volt potential appearing between the tip and ring sides of the line may be sufficient to completely corrupt an ongoing telephone conversation occurring on that line. Hence, if the gate potential of FET 45 were allowed to change over a sufficiently wide range as a result of this AC power induction thereby turning the FET on and off, then the current flowing from earth ground into the ring side of the line would be interrupted. As such, the status of the line would improperly change between being unbalanced and balanced. Consequently, current monitors located at the central office and which detect unbalances in the line might drop out or hesitate, and as such not provide a proper indication to the central office to apply battery voltage to the line. Capacitor 39 appropriately stabilizes the operation of circuit 40 by charging to a potential that keeps the gate of FET 45 on even in the presence of a widely varying potential between the ring side of the line and earth ground. This, in turn, prevents AC variations in this potential from adversely affecting the status of the line. Moreover, diode 47 prevents any such AC current flow from being route through circuit 40 and, in turn, discharging capacitor 39 and corrupting the operation of this circuit. Inasmuch as this diode half wave rectifies the unbalanced AC current flow superimposed on the line and thereby increases the DC current flowing on the line, this increased current flow assists the central office in recognizing an unbalanced condition.

Once, the central office recognizes the unbalanced condition on the telephone line, it will apply battery voltage to the line which will cause loop current to flow through the tip and ring sides of the line. At this point, circuit 40 turns off and decreases the unbalanced line current to essentially zero thereby returning the line to a balanced condition. Specifically, as soon as loop current flows in the line, a potential difference appears across resistors 203 and 207 located within precision load 200. These resistors, as discussed above, attenuate this potential to an appropriate value, appearing at junction 205, which through resistor 33 provides sufficient base current to turn transistor 35 on. This transistor is a current switch or indicator of loop current. Once this transistor turns on, it provides a low impedance discharge path for charge stored on capacitor 39. As a result, the voltage on this capacitor rapidly decreases to essentially zero (actually approximately 0.2 volts) which is well below the potential needed to maintain FET 45 on. Consequently, once FET 45 turns off, current ceases to flow through resistor 48. Resistor 43 is now the only resistor that continues to unbalance the line. Its value, typically 1M ohm (but can be as high as 10M ohm without adversely affecting the operation of circuit 40), is substantially higher than that of resistor 48. Since FET 45 is a voltage controlled switch, then the only current that now flows through resistor 43 is leakage current flowing through the gate of the FET plus any current resulting from potentials that exceed the breakdown of zener diode 37 and occurring between ring lead 27 and earth ground during an active line state. The magnitude of this leakage current is for all practical purposes insignificant and essentially zero. Moreover, the value (typically 100K ohm) of resistor 33 is substantially larger than that of resistors 203 (typically 287 ohms) and 207 (typically 88.7 ohms). As such, once FET 45 is switched off due to the conduction of transistor 35, essentially no current other than loop current provided by the central office flows throughout the tip and ring sides of the telephone line. Hence, the line returns to a balanced condition. Thus, circuit 40 imposes insignificant effects on line (tip to ring) loading a all times. After loop current is applied to the line, the central office then appropriately applies dial tone thereto. Clearly, resistor 33, in lieu of being connected to junction 205, can instead be connected directly to tip lead 81. In this case, the value of resistor 33 may need to be increased in order to provide the same level of drive current for transistor 35 but resulting from an increased potential that would appear across this resistor.

FIG. 3 depicts a schematic diagram of a second emodiment of the inventive ground start circuit, i.e. ground start circuit 50, shown in FIG. 1. Ground start circuit 50 is a totally independent (self-contained) ground start circuit which does not rely on any circuitry, such as external load resistors, to initiate a ground start operation. Ground start circuit 30 (see FIG. 2), on the other hand, utilizes an external load and is therefore designed to be used in conjunction with additional loop test circuitry, such as measurement circuit 100. As diccussed, ground start circuit 50, shown in FIG. 3, is used in conjunction with handset 90 (or a telephone) that is to be connected, via leads 85 and 87, to telephone line 3 for purposes of monitoring the line. As shown in FIG. 3, tip lead 25 is connected directly through ground start circuit 50 and via lead 85 and jack 89 to handset 90. Ground start circuit 50 also contains transistor 55; capacitors 57 and 67; zener diode 6;; diode 71; resistors 59, 61, 66 and 69; and FET 73. This ground start circuit operates in a very similar manner as does ground start circuit 30, which has been disuussed above in connection with FIG. 2.

Resistor 61 and capacitor 57, shown in FIG. 3, together form a low pass filter which insures that ground start circuit 50 operates in a stable fashion in the presence of substantial AC power line induction and various transient signals, such as switching noise. One end, i.e. end A, of resistor 59 is connected to ring lead 21 and, through capacitor 57, to the base of transistor 55. In addition, since the amount of resistance applied by handset 90 that is attached to jack 89 is unknown (symbolized by load resistance 95), resistor 59 being placed in series with the load serves as a loop current sensing resistor. The value of resistor 59, typically 68 ohms, is much lower than the value of load resistance 95 plus line resistance and thereby does not impart any adverse affect to the normal operation of the line, e.g. dialing and the like. Within circuit 60, one side of resistor 61 is connected to end B of resistor 59; while the other side of resistor 61 is connected to the base of transistor 55. Zener diode 65 and capacitor 67 are both connected, via leads 63 and 87, across end B of resistor 59 and the collector of transistor 55. This transistor is preferably an NPN bipolar transistor. The emitter of this transistor is connected to ring lead 21. In addition, the collector of transistor 55 is also connected, via lead 63, to the gate of FET 73. The source of this FET is also connected, via lead 87 to end B of resistor 59. The collector of transistor 55 is also connected to one end of resistor 66. The drain of FET 73 is connected to one end of resistor 69. Both of the other ends of resistors 66 and 69 are connected to the cathode of diode 71. The anode of this diode is connected to earth ground.

Circuit 60 which is formed of resistors 61, 66, and 69; transistor 55; zener diode 65; capacitor 67; diode 71 and FET 73 operates in an identical fashion as does circuit 40 (see FIG. 2). Each component in circuit 60 provides the same function as does its corresponding component in circuit 40.

Specifically, to understand the operation of circuit 60 shown in FIG. 3 assume for the moment that switch 20 has been set to connect the telephone line voltage to ground start circuit 50 and that switch 10 (see FIG. 1) has not yet been depressed. At this point, transistor 55 and FET 73 situated within circuit 60, shown in FIG. 3, are both off. The circuit remains in this state until switch 10 is depressed. Since telephone line 3 is a ground start line, at the instant switch 10 is depressed, there will be no potential across the tip and ring sides of the line and hence no loop current flowing in the line. At this point, the line is balanced. However, there will be a positive potential measured from earth ground to ring lead 21. By virtue of this potential, capacitor 67 will begin to charge through current flowing from earth ground through diode 71 and resistor 66. Consequently, the voltage across this capacitor will increase. Zener diode 65 limits the voltage across the capacitor to a level, typically 14 volts, which is safely below the maximum gate potential of FET 73. This capacitor will continue to charge until its potential reaches a predefined threshold value sufficient to turn FET 73 on. Once the FET turns on, a relatively large amount of drain current flows through resistor 69 and FET 73 to the ring side of the line. No current flows in the tip side. As such, at this point line 3 becomes highly unbalanced. The value of resistor 69, typically 330 ohms, is chosen to allow sufficient minimum DC current to flow into the ring side of the telephone line to establish an unbalanced condition that is detectable by the central office but not enough current to cause a potential across this resistor which would disadvantageously result in turning FET 73 off.

Now, once, the central office recognizes the unbalanced condition on the telephone line, it will apply battery voltage to the line which will cause loop current to flow through the tip and ring sides of the line. At this point, circuit 60 turns off and decreases the unbalanced line current to essentially zero thereby returning the line to a balanced condition. Specifically, as soon as loop current flows in the line, a potential difference appears across loop current sensing resistor 59. This potential, applied through resistor 61, provides sufficient base current to turn transistor 55 on. This transistor is a current switch or indicator of loop current. Once this transistor turns on, it provides a low impedance discharge path through resistor 59 for charge stored on capacitor 67. As a result, the voltage on this capacitor rapidly decreases to essentially zero (actually approximately 0.2 volts) which is well below the potential needed to maintain FET 73 on. Consequently, once FET 73 turns off, current ceases to flow through resistor 69. Resistor 66 is now the only resistor that continues to unbalance the line. Its value, typically 1M ohm (but can be as high as 10M ohm without adversely affecting operation of circuit 60), is substantially higher than that of resistor 69. Since FET 73 is a voltage controlled switch, then the only current that now flows through resistor 67 is leakage current through the gate of the FET plus any current resulting from potentials that exceed the breakdown of zener diode 65 and occur between ring lead 21 and earth ground during an active line state. The magnitude of this leakage current is for all practical purposes insignificant and essentially zero. Once FET 73 is switched off due to the conduction of transistor 55, essentially no current other than loop current provided by the central office flows throughout the tip and ring sides of the telephone line. Hence, the line returns to a balanced condition. Thus, circuit 60 imposes insignificant effects on line (tip to ring) loading at all times. After loop current is applied to the line, the central office then appropriately applies dial tone thereto.

If either of these ground start circuits is used in conjunction with other test equipment on a loop start line, that circuit will advantageously remain substantially electrically transparent to the loop start line. Specifically, with a loop start line, loop current is applied by the central office to the line immediately after a completed electrical path is made between tip and ring sides of the line, such as for example by a subscriber taking a receiver off-hook from a telephone set that is connected to this line. In this case, potential will immediately appear across resistor 207 in ground start circuit 30 (see FIG. 2) or across load current sensing resistor 59 in ground start circuit 50. This, in turn, will cause transistor 35 in circuit 40 or transistor 55 in circuit 50 to conduct, thereby placing a low impedance path across capacitor 39 or 67, respectively. As such, FET 45 in circuit 30 or FET 73 in circuit 50 will not conduct thereby maintaining the loop start line that is connected to either circuit 30 or 50, respectively, in balanced condition.

Although two different embodiments of the inventive ground start circuit have been shown and described herein, those skilled in the art may readily construct many other embodiments that still incorporate the teachings of the present invention.

We claim:

1. A ground start circuit for use in conjunction with a telephone line having at least two wires comprising:

means, connected between an earth ground connection and a first terminal that is to be connected to one wire of a two-wire telephone line and operative in response to a potential difference appearing thereacross, for providing a control signal that changes in value;

means, connected between said first terminal and the earth ground connection and responsive to said control signal, for establishing a low impedance path between said first terminal and the earth ground connection whenever said control signal reaches a threshold value whereby said telephone line is placed in an unbalanced condition; and means, connected to said providing means and responsive to a potential difference subsequently applied across said first terminal and a second terminal that is to be connected to said second wire of said two-wire telephone line, for decreasing the value of said control signal to a level sufficient for said establishing means to eliminate said low impedance path existing between said first terminal and the earth ground connection, whereby said telephone line is returned to a substantially balanced condition.

2. The circuit in claim 1 wherein said providing means comprises a capacitor and a first resistor connected in series, wherein one end of said capacitor is connected to said first terminal, the other end of said capacitor is connected to one end of the first resistor and the other end of said first resistor is connected to the earth ground connection and wherein said control signal is a potential difference that appears across said capacitor.

3. The circuit in claim 2 wherein said establishing means comprises a volage controlled switch that is controlled by said control signal.

4. The circuit in claim 3 wherein said decreasing means is a current switch operative in response to said potential difference appearing across both said first and second terminals for providing a low impedance discharge path for charge stored on said capacitor.

5. The circuit in claim 4 wherein said decreasing means comprises a resistive load electrically connected in a path between both said of said first and second terminals.

6. The circuit in claim 5 wherein said voltage controlled switch is a field effect transistor.

7. The circuit in claim 4 wherein said decreasing means comprises a resistive load placed in series with said first terminal for generating a voltage thereacross that provides sufficient drive potential for said decreasing means.

8. The circuit in claim 7 wherein said voltage controlled switch is a field effect transistor.

9. In a subscriber loop test system for testing a two wire telephone line, a ground start circuit that is capable of being connected to said telephone line in order to obtain dial tone on said telephone line from a central office connected thereto, said ground start circuit comprising:
means, connected between an earth ground connection and a first terminal that is to be connected to one wire of a two-wire telephone line and operative in response to a potential difference appearing thereacross, for providing a control signal that changes in value;
means, connected between said first terminal and the earth ground connection and responsive to said control signal, for establishing a low impedance path between said first terminal and the earth ground connection whenever said control signal reaches a threshold value whereby said telephone line is placed in an unbalanced condition; and
means, connected to said providing means and responsive to a potential difference subsequently applied across said first terminal and a second terminal that is to be connected to said second wire of said two-wire telephone line, for decreasing the value of said control signal to a level sufficient for said establishing means to eliminate said low impedance path existing between said first terminal and the earth ground connection, whereby said telephone line is returned to a substantially balanced condition.

10. The system in claim 9 further compiises means connected to said ground start circuit for testing a signal appearing on said telephone line and provided by a central office connected thereto.

11. The circuit in claim 10 wherein said providing means comprises a capacitor and a first resistor connected in series, wherein one end of said capacitor is connected to said first terminal, the other end of said capacitor is connected to one end of the first resistor and the other end of said first resistor is connected to the earth ground connection and wherein said control signal is a potential difference that appears across said capacitor.

12. The circuit in claim 11 wherein said establishing means comprises a voltage controlled switch that is controlled by said control signal.

13. The circuit in claim 12 wherein said decreasing means is a current switch operative in response to said potential difference appearing across both said first and second terminals for providing a low impedance discharge path for charge stored on said capacitor.

14. The circuit in claim 13 wherein said decreasing means comprises a resistive load electrically connected in a path between both said of said first and second terminals.

15. The circuit in claim 14 wherein said voltage controlled switch is a field effect transistor.

16. The circuit in claim 13 wherein said decreasing means comprises a resistive load placed in series with said first terminal for generating a voltage thereacross that provides sufficient drive potential for said decreasing means.

17. The circuit in claim 16 wherein said voltage controlled switch is a field effect transistor.

18. In a ground start circuit connected to a telephone line having at least two wires, a method of invoking ground start operation of the line comprising the steps of:
providing, in response to a potential difference appearing between an earth ground connection and one wire of a two-wire telephone line, a control signal that changes in value;
establishing, in response to said control signal, a low impedance path between said one wire of the telephone line and the earth ground connection whenever said control signal reaches a threshold value whereby said telephone line is placed in an unbalanced condition; and
decreasing, in response to a potential difference subsequently applied across both of said two wires of the telephone line, the value of said control signal to a level sufficient to eliminate said low impedance path existing between said first wire and the earth ground connection, whereby said telephone line is returned to a substantially balanced condition.

19. The method in claim 18 wherein said providing step includes the step of storing, in response to said potential difference, a changing amount of charge on a capacitor to provide said control voltage, wherein one end of the capacitor is connected to said one wire of the telephone line and the other end is connected in series with a resistor to the earth ground connection.

20. The method in claim 19 wherein said decreasing step includes the step of energizing a current switch, in response to a potential difference appearing across both said first and second terminals, for providing a low impedance discharge path for the charge stored on said capacitor.

* * * * *